United States Patent
Kitagawa

(10) Patent No.: US 7,948,130 B2
(45) Date of Patent: May 24, 2011

(54) ROTATING ELECTRICAL MACHINE

(75) Inventor: Teruhisa Kitagawa, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/706,714

(22) Filed: Feb. 17, 2010

(65) Prior Publication Data

US 2010/0141067 A1    Jun. 10, 2010

Related U.S. Application Data

(63) Continuation of application No. PCT/JP2008/063261, filed on Jul. 24, 2008.

(30) Foreign Application Priority Data

Aug. 17, 2007 (JP) ................................ 2007-212803

(51) Int. Cl.
*H02K 3/46* (2006.01)
*H02K 3/50* (2006.01)
(52) U.S. Cl. ........................................................ 310/71
(58) Field of Classification Search ............... 310/71
See application file for complete search history.

(56) References Cited

U.S. PATENT DOCUMENTS

| | | | | |
|---|---|---|---|---|
| 5,900,687 A | * | 5/1999 | Kondo et al. | ................... 310/71 |
| 6,600,244 B2 | * | 7/2003 | Okazaki et al. | ................. 310/71 |
| 6,914,356 B2 | * | 7/2005 | Yamamura et al. | ............. 310/71 |
| 7,514,829 B2 | * | 4/2009 | Otsuji et al. | ..................... 310/71 |
| 7,557,478 B2 | * | 7/2009 | Hoshika | ........................ 310/71 |
| 2004/0164641 A1 | | 8/2004 | Yamada et al. | |

FOREIGN PATENT DOCUMENTS

| | | |
|---|---|---|
| JP | 06-233483 | 8/1994 |
| JP | 2002-300745 | 10/2002 |
| JP | 2004-282989 | 10/2004 |
| JP | 2005-304278 | 10/2005 |
| JP | 2006-158199 | 6/2006 |

* cited by examiner

*Primary Examiner* — Burton Mullins
(74) *Attorney, Agent, or Firm* — Ditthavong Mori & Steiner, P.C.

(57) ABSTRACT

A rotating electrical machine includes a stator of which winding terminals are connected to conductive members using a connection substrate on which the conductive members are disposed and which includes an insulating plate. The connection substrate includes a plurality of circumferential grooves and a plurality of radial grooves. The conductive members are fitted to the circumferential grooves in a concentric manner. The conductive members coated with insulating films are formed in a bent shape such that the conductive members project from the radial grooves to an outside of the connection substrate and are connected to the winding terminals of the stator.

5 Claims, 6 Drawing Sheets

ROTATING ELECTRICAL MACHINE

CROSS-REFERENCE TO RELATED APPLICATIONS

The present application is a continuation application of PCT/JP2008/063261, filed Jul. 24, 2008, which claims priority to Japanese Patent Application No. 2007-212803, filed Aug. 17, 2007. The contents of these applications are incorporated herein by reference in their entirety.

BACKGROUND OF THE INVENTION

1. Field of the Invention

The present invention relates to a rotating electrical machine.

2. Discussion of the Background

In an example of a connection structure for stator winding according to a related art, winding terminals for respective magnetic poles are connected to conductive members for respective phases and a common conductive member. The conductive members are electrically insulated from each other. The above-mentioned conductive members and insulators used to insulate the conductive members are formed as independent members different from stators and are formed in a substrate shape to facilitate the connection between the winding terminals and the conductive members. Japanese Examined Patent Application Publication No. 6-233483 and Japanese Unexamined Patent Application Publication No. 2006-158199 disclose such a structure.

SUMMARY OF THE INVENTION

According to one aspect of the present invention, a rotating electrical machine includes a stator of which winding terminals are connected to conductive members using a connection substrate on which the conductive members are disposed and which includes an insulating plate. The connection substrate includes a plurality of circumferential grooves and a plurality of radial grooves. The conductive members are fitted to the circumferential grooves in a concentric manner. The conductive members coated with insulating films are formed in a bent shape such that the conductive members project from the radial grooves to an outside of the connection substrate and are connected to the winding terminals of the stator.

According to another aspect of the present invention, a rotating electrical machine includes a connection structure of a stator of which winding terminals are connected to conductive members using a connection substrate on which the conductive members are disposed and includes an insulating plate. Each of the conductive members includes a connecting terminal, a copper wire, and an insulator. The connection substrate includes supporting portions that support the connecting terminals of the conductive members. The connecting terminals of the conductive members coated with insulating films are attached to the supporting portions such that connecting portions of the connecting terminals project to an outside of the connection substrate and are connected to the winding terminals of the stator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
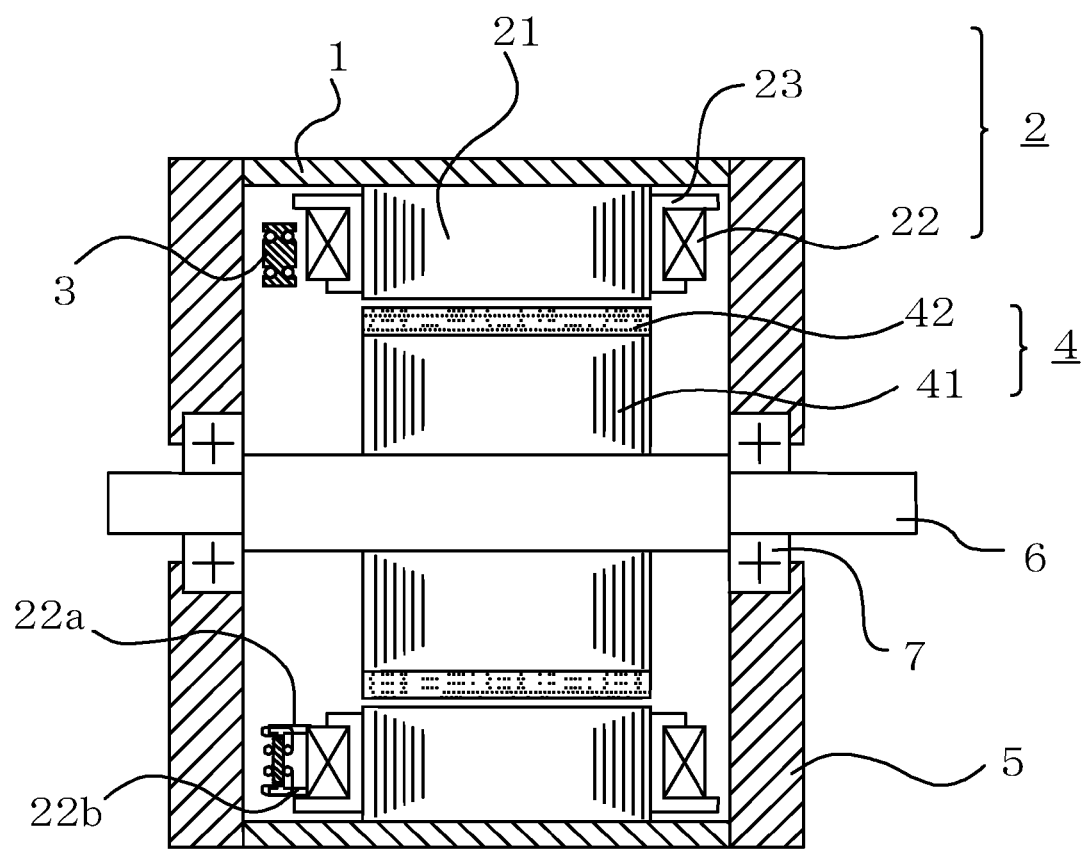
FIG. 1 is a sectional side view of an electric motor according to a first embodiment.

Embodiments will now be described with reference to the accompanying drawings, wherein like reference numerals designate corresponding or identical elements throughout the various drawings.

Figure 2:
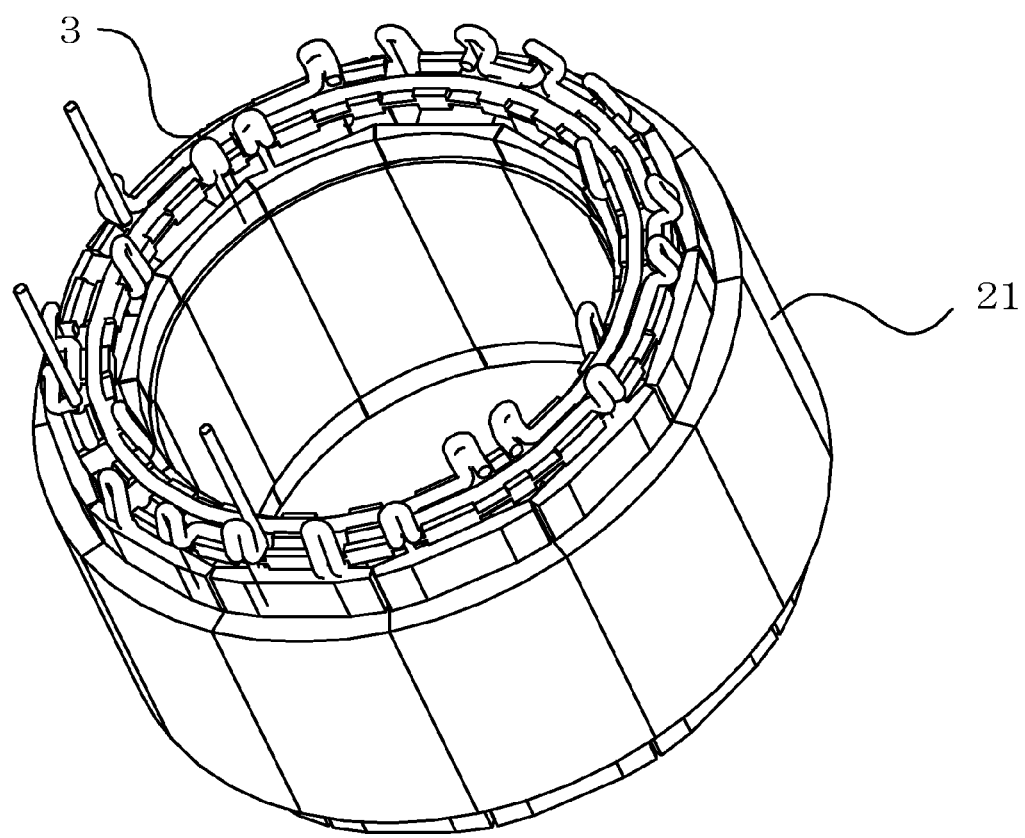
FIG. 2 is a perspective view of a stator to which a connection unit according to the first embodiment is attached.

FIG. 1 is a sectional side view of an electric motor according to a first embodiment. FIG. 2 is a perspective view of a stator.

A stator 2 includes a stator core 21, stator winding 22, and an insulator 23. A rotor 4 includes a rotor core 41 and a permanent magnet 42 provided on an outer periphery of the rotor core 41. The stator core 21 is attached to a frame 1 of the motor, and the stator winding 22 is wound around the stator core 21 with the insulator 23 disposed therebetween.

Figure 3:
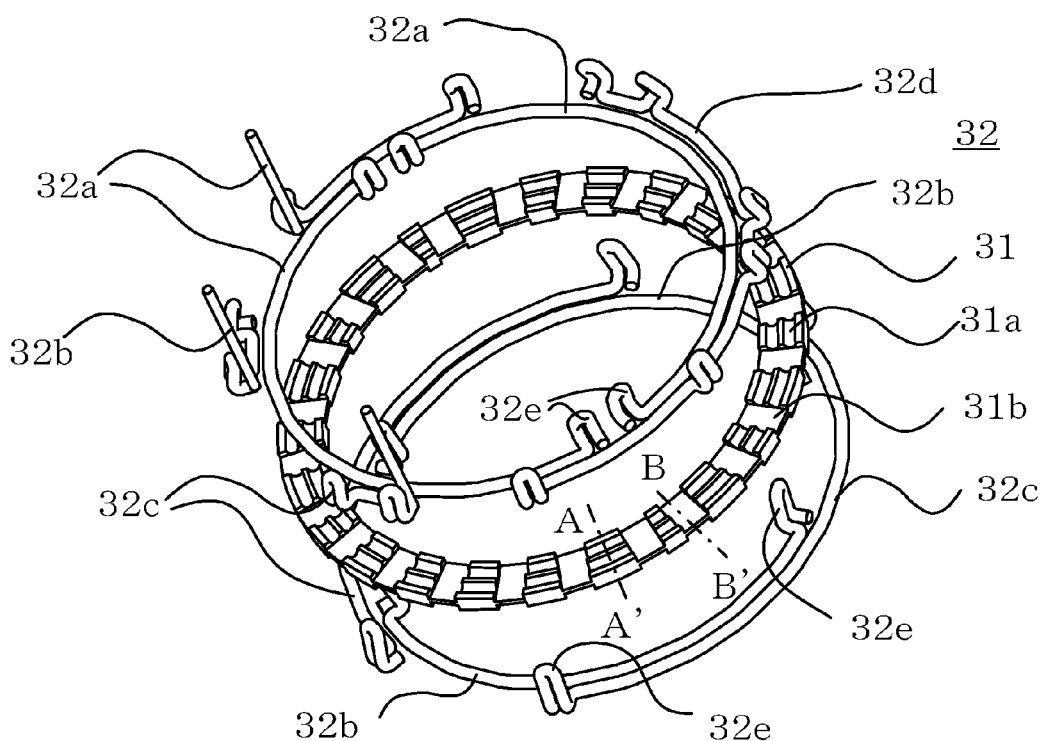
FIG. 3 is an exploded perspective view of the connection unit according to the first embodiment.

FIG. 3 is an exploded perspective view illustrating the detailed structure of a connection unit 3. The connection unit 3 includes an annular connection substrate 31 and conductive members 32. The connection substrate 31 includes circumferential grooves 31a that are concentric to each other and radial grooves 31b. The conductive members 32 include conductive members 32a, 32b, and 32c for respective phases, a common conductive member 32d, and bent portions 32e of the respective conductive members. The conductive members 32 are composed of linear elements that are coated with insulating films and that provide a sufficient current density to conduct a current to be applied to the winding wires of each phase. In the case where, for example, each phase corresponds to four winding wires, the cross section of the conductive members 32 is set to four times the cross section of each winding wire or more.

The connection substrate 31 is obtained by forming the concentric circumferential grooves 31a in an insulating circular plate along the circumferential direction of the circular plate. In addition, the radial grooves 31b are formed in the connection substrate 31 so as to extend radially through all of the circumferential grooves 31a.

Figure 4A:
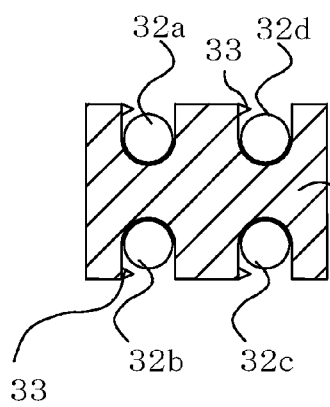
FIGS. 4A and 4B are enlarged sectional views of FIG. 3 according to the first embodiment taken along lines A-A' and B-B', respectively.
Figure 4B:
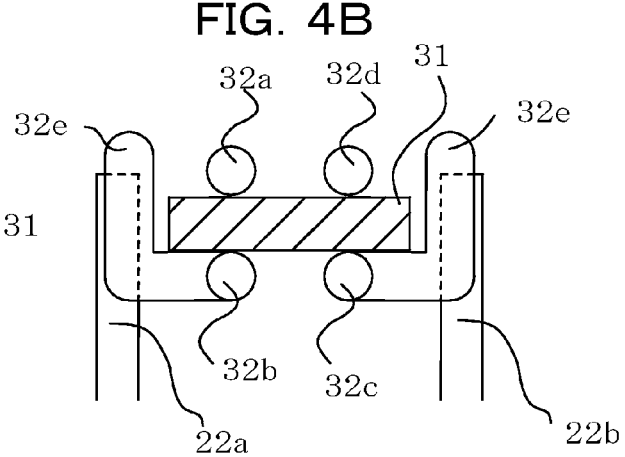

FIGS. 4A and 4B are enlarged sectional views of parts of FIG. 3, and illustrate the detailed structure of the connection substrate 31. FIG. 4A is a sectional view of FIG. 3 taken along line A-A', and FIG. 4B is a sectional view of FIG. 4B taken along line B-B'. As is clear from FIG. 4A, the circumferential grooves 31a for receiving the conductive members 32 are formed at each side of the connection substrate 31, and the conductive members 32a, 32b, and 32c of the respective phases and the common conductive member 32d are placed in the circumferential grooves 31a. FIG. 4B shows the state in which the conductive members 32 are arranged and the state of connecting sections in which the bent portions 32e of the conductive members 32 are connected to winding terminals 22a and 22b.

The conductive members 32a, 32b, and 32c of the respective phases and the common conductive member 32d are bent and are fitted in the circumferential grooves 31a in the connection substrate 31. As shown in FIG. 4B, the bent portions 32e of the conductive members are disposed so as to project from the radial grooves 31b. The radial grooves 31b are provided in directions corresponding to the positions at which the winding terminals 22a and 22b of the stator 2 are located when the connection substrate 31 is attached to the stator 2. In addition, claws 33 are provided at suitable positions to prevent the conductive members 32 from falling.

The connection substrate 31 is attached to the stator 2, and the winding terminals 22a and 22b of the stator winding are welded to the respective bent portions 32e, so that the winding wires for the respective magnetic poles in the stator are connected to the bent portions 32e.

Figure 5A:
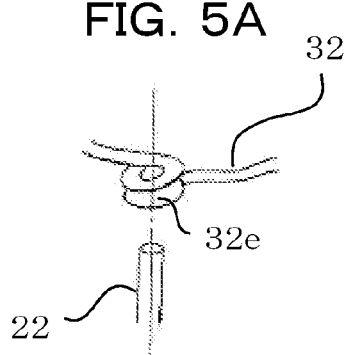
FIGS. 5A, 5B, and 5C are diagrams illustrating examples of the shapes in which a bent portion of a conductive member according to the first embodiment can be formed.
Figure 5B:
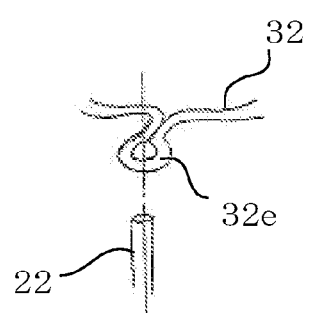
Figure 5C:
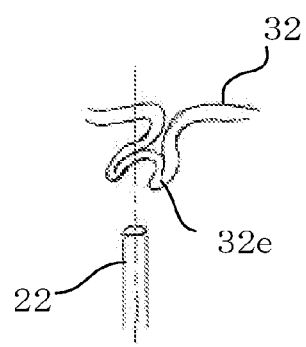

In the present embodiment, the bent portions 32e of the conductive members are formed in a bent shape. However, the present invention is not limited to this. For example, as shown in FIGS. 5A to 5C, the conductive members 32 may be wound in a helical shape (FIG. 5A) or be bent in a split-pin shape (FIG. 5B) or a scissor shape (FIG. 5C). In addition, the method for connecting the winding terminals of the stator to the conductive members is not limited to welding, and may also be crimping, soldering, or the like.

Figure 6:
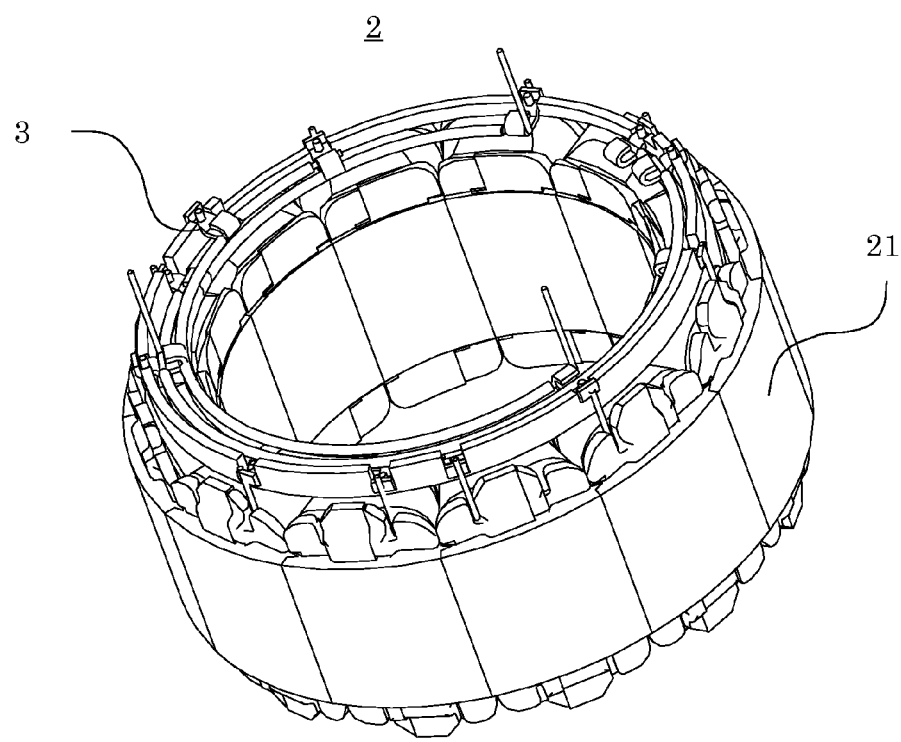
FIG. 6 is a perspective view of a stator to which a connection unit according to a second embodiment is attached.
Figure 7:
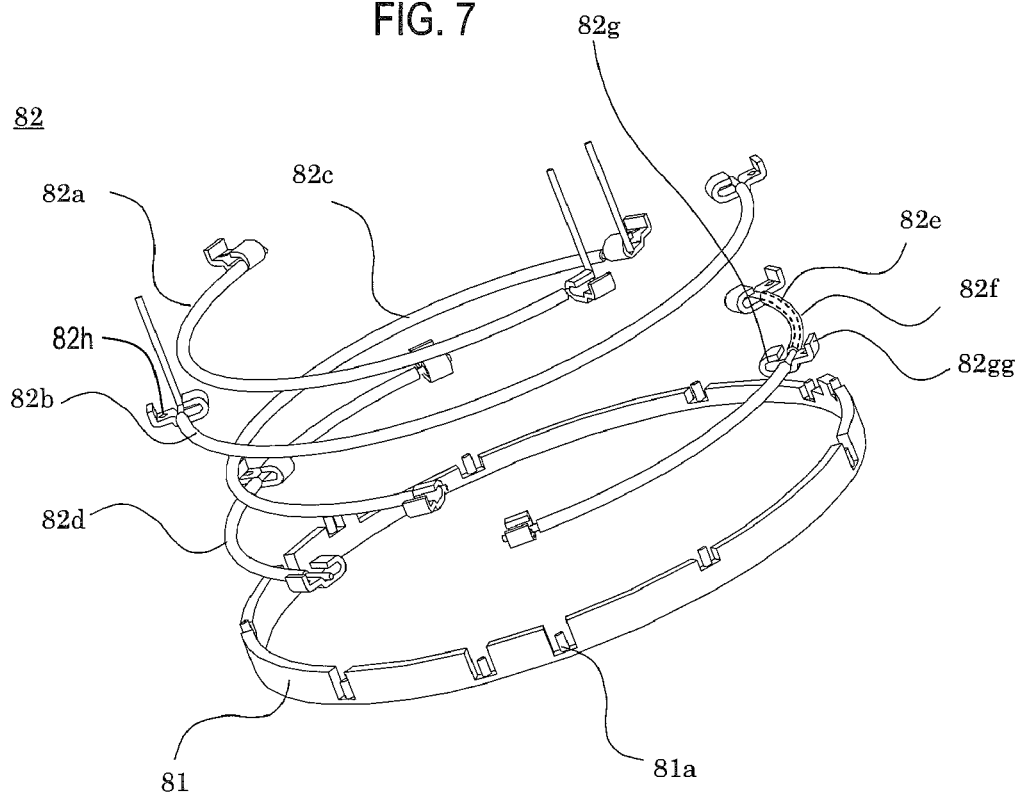
FIG. 7 is an exploded perspective view of the connection unit according to the second embodiment.

FIG. 6 is a perspective view of a stator including a connection unit 3 according to a second embodiment. FIG. 7 is an exploded perspective view of the connection unit. Similar to the first embodiment, the connection unit 3 includes an annular connection substrate 81 and conductive members 82. The connection substrate 81 includes a plurality of terminal supports 81a for supporting connection terminals on the substrate. The terminal supports 81a are axially extending rods that are shaped such that the terminal supports 81a can receive a hole 82h on the connecting terminal 82g and support the connection terminals and such that connecting portions 82gg of the connection terminals project from the connection substrate 81. The conductive members 82 include conductive members 82a, 82b, and 82c of the respective phases and a common conductive member 82d, and each conductive member is composed of a copper wire 82e, an insulator 82f, and a connecting terminal 82g. The insulator 82f is formed so as to protect a portion other than the connecting point between the copper wire 82e and the connecting terminal 82g. The copper wire 82e and the connecting terminal 82g are connected to each other by crimping to establish electrical continuity therebetween.

Figure 8:
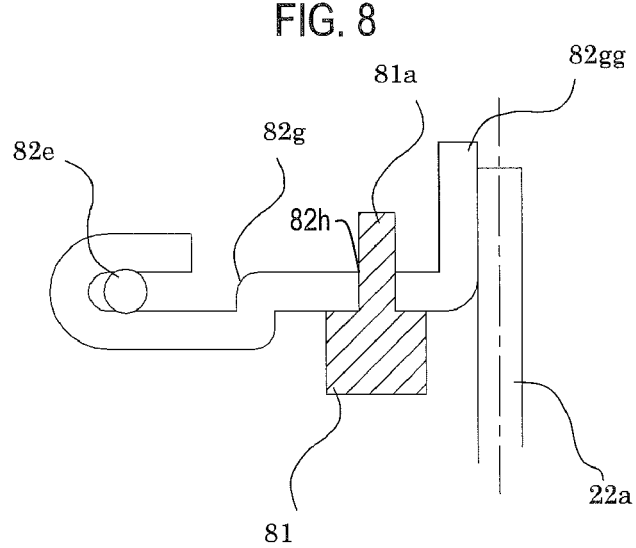
FIG. 8 is an enlarged sectional view of a part of FIG. 7.

The connecting terminals 82g of the conductive members 82a, 82b, and 82c of the respective phases and the common conductive member 82d are fitted to the terminal supports 81a of the connection substrate 81. As shown in FIG. 8, the connecting portion 82gg of each conductive member is disposed so as to project from the corresponding terminal support 81a. The terminal supports 81a are provided in directions corresponding to the positions at which the winding terminals 22a of the stator 2 are located when the connection substrate 81 is mounted on the stator 2.

The connection substrate 81 is attached to the stator 2, and the winding terminals 22a of the stator winding are welded to the respective connecting portions 82gg, so that the winding wires for the respective magnetic poles in the stator are connected to the connecting portions 82gg.

Figure 9A:
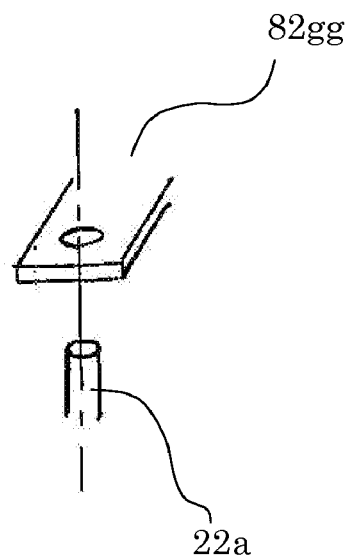
FIGS. 9A and 9B are diagrams illustrating examples of connection terminals according to the second embodiment.
Figure 9B:
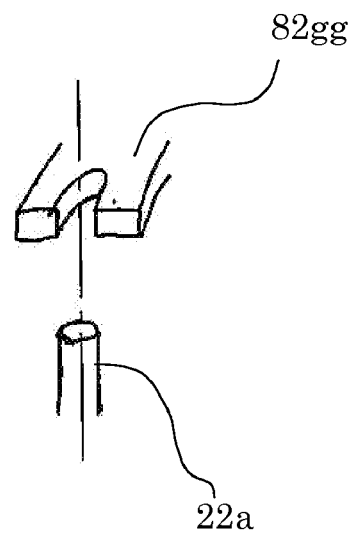

Although an example in which the connecting portions 82gg are connected to the winding terminals by welding is described above, the present invention is not limited to this. For example, as shown in FIGS. 9A and 9A, each connecting portion 82gg may be shaped such that a hole is formed therein, or be formed in a scissor shape. In addition, the method for connecting the winding terminals of the stator to the conductive members is not limited to welding, and may also be crimping, soldering, or the like. Similarly, the method for connecting the copper wire 82e to the connecting terminal 82g is not limited to crimping, and may also be welding or soldering.

In addition, although the electric motor is explained in the embodiments, the present invention may also be applied to an electric generator.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A rotating electrical machine comprising:
   a stator of which winding terminals are connected to conductive members using a connection substrate on which the conductive members are disposed and which comprises an insulating plate,
   wherein the connection substrate includes a plurality of circumferential grooves and a plurality of radial grooves, the conductive members being fitted to the circumferential grooves in a concentric manner,
   wherein the conductive members coated with insulating films are formed in a bent shape such that the conductive members project from the radial grooves to an outside of the connection substrate and are connected to the winding terminals of the stator,
   wherein the connection substrate has a first surface and a second surface opposite to the first surface, and
   wherein the circumferential grooves and the radial grooves are provided at both the first surface and the second surface of the connection substrate.

2. The rotating electrical machine according to claim 1, wherein the circumferential grooves and the radial grooves in the connection substrate are provided with claws that are configured to prevent the conductive members from falling.

3. The rotating electrical machine according to claim 1, wherein terminal portions of the conductive members connected to the winding terminals of the stator are formed in a helical shape, a split-pin shape, or a scissor shape instead of the bent shape.

4. The rotating electrical machine according to claim 1, wherein the circumferential grooves and the radial grooves are provided at substantially the same positions on both the first surface and the second surface of the connection substrate.

5. A rotating electrical machine comprising:
   a connection structure of a stator of which winding terminals are connected to conductive members using a connection substrate on which the conductive members are disposed and comprises an insulating plate,
   wherein each of the conductive members includes a connecting terminal, a copper wire, and an insulator,
   wherein the connection substrate includes supporting portions formed as axially extending rods that are configured to receive a hole on each of the connecting terminals and support the connecting terminals of the conductive members, and
   wherein the connecting terminals of the conductive members coated with insulating films are attached to the supporting portions such that connecting portions of the connecting terminals project to an outside of the connection substrate and are connected to the winding terminals of the stator.

* * * * *